Figure 1:
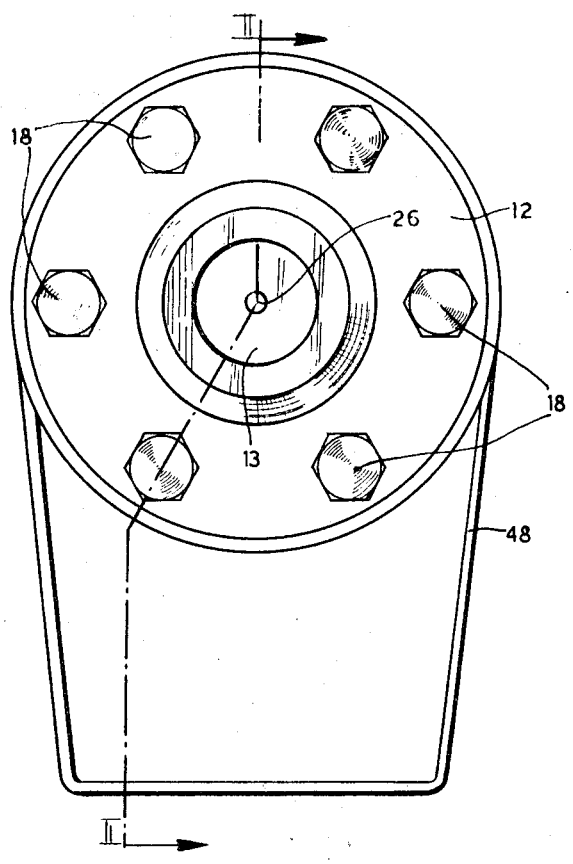

United States Patent
Michellone et al.

[15] 3,684,238
[45] Aug. 15, 1972

[54] FLUID PRESSURE MODULATING VALVES

[72] Inventors: Gian Carlo Michellone, Strada delle Camporelle, Cambiano, Turin; Mario Palazzetti, Via Fratel Teodoreto 7, Turin, both of Italy

[22] Filed: Oct. 21, 1970

[21] Appl. No.: 82,666

[30] Foreign Application Priority Data
Nov. 27, 1969 Italy......................54189 A/69

[52] U.S. Cl. ...................251/129, 251/141, 251/282
[51] Int. Cl. .........................F16k 31/06, F16k 39/04
[58] Field of Search......................251/141, 129, 282

[56] References Cited

UNITED STATES PATENTS

| | | | |
|---|---|---|---|
| 3,446,473 | 5/1969 | Barker | 251/129 X |
| 3,100,103 | 7/1963 | Bullard | 251/141 X |
| 3,531,080 | 9/1970 | Dillon | 251/129 |
| 2,841,216 | 7/1958 | McKinnon | 251/141 X |

FOREIGN PATENTS OR APPLICATIONS

| 33,074 | 11/1964 | Germany | 251/141 |
|---|---|---|---|

*Primary Examiner*—Arnold Rosenthal
*Attorney*—Sughrue, Rothwell, Mion, Zinn & Macpeak

[57] ABSTRACT

An electromagnetically controlled fluid pressure modulating valve comprises a cylindrical body within which a valve piston is freely movable. The valve piston controls the opening and closing of inlet and outlet passageways by means of a conical valve seat ground on one end of the piston and a corresponding seat on the end of the cylinder. The piston has a passageway permitting the flow of fluid into the blind end of the cylinder to substantially equalize the fluid pressure on both sides of the piston. The valve piston forms the movable core of an electromagnet the current flowing through which determines the position of the piston and therefore the amount of fluid flow through valve.

1 Claim, 3 Drawing Figures

INVENTORS
GIAN CARLO MICHELLONE
MARIO PALAZZETTI

BY Sughrue, Rothwell, Mion,
Zinn & Macpeak
ATTORNEYS

FLUID PRESSURE MODULATING VALVES The present invention relates to an electromagnetically controlled valve for modulating fluid pressure.

Electromagnetically controlled valves for varying the pressure of a fluid supplied to a pressure responsive device are already known. In general, however, they are of a rather complicated construction and include a large number of parts which are mostly machined to size within very rigorous tolerances. As a consequence of this their application is limited to apparatus in which the cost is of secondary importance.

In order to produce on electromagnetic pressure modulating valve economically, it is necessary to have a reduced number of parts, and moreover, they must be parts which do not require very rigorous manufacturing tolerances or have a complicated structure which requires assembling. Preferably they should be suitable for economical manufacture using modern mass production methods. Another disadvantage of valves of the known type is that they require relatively high electrical power for their operation.

According to the present invention there is provided an electromagnetically controlled valve for modulating fluid pressure, comprising a substantially cylindrical body having fluid inlet and outlet passageways fluid flow through which is controlled by a valve piston which is movably mounted within the said cylindrical body, the valve piston forming the core of an electromagnet the winding of which surrounds the cylindrical body, and the position of the valve piston within the cylindrical body being controlled by the current in the winding.

Figure 3:
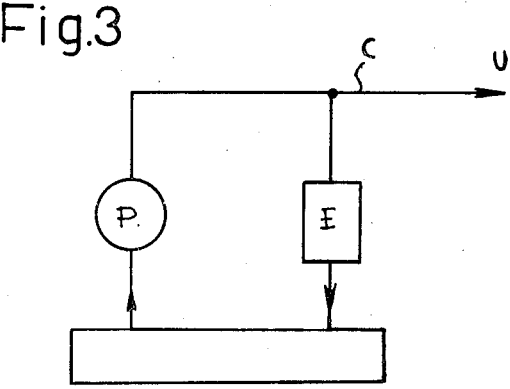
Figure 2:
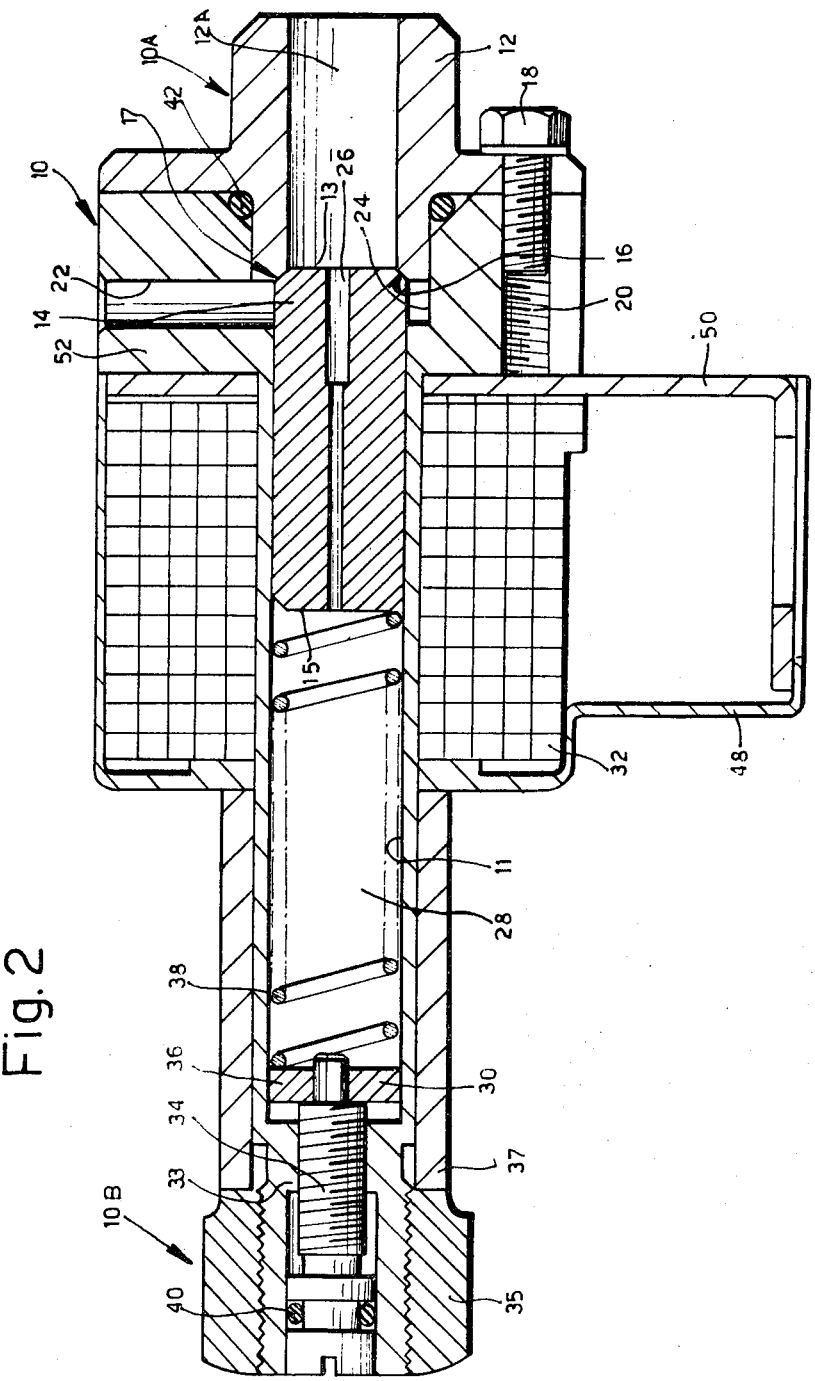

One embodiment of the present invention will now be more particularly described, by way of example, with reference to the accompanying drawings, in which, FIG. 1 is a front view of a valve constructed in accordance with the present invention;

FIG. 2 is a sectional view of the embodiment of FIG. 1 taken along the line 11 — 11; and FIG. 3 is a schematic representation of one application of the valve shown in FIGS. 1 and 2 in a fluid circuit.

In the description which follows it is assumed that the fluid is oil.

With reference to FIGS. 1 and 2, there is shown a valve body 10, having a cylindrical bore 11 which has an open end 10A and a closed end 10B. A valve piston 14 is freely movable within the bore 11 and has one of its end faces 13 adapted to mate against a conical seat 16 with a frusto-conical face 17. The valve seat 16 is formed in a cylinder head attachment 12, fixed to the body of the cylinder 10 by screws 18 screwed in holes 20. The cylinder head 12 forms a passageway for the oil and an external connector for the valve to connect it into a fluid circuit. An annular chamber 24 communicates with the bore 11 of the cylinder 10 and a plurality of radial passageways 22, only one of which is represented in FIG. 2, provide the outlet for the oil which can pass from the inlet passageway 12A to the outlet passageways 22 only when the valve piston is clear of the conical seat 16. If the valve is mounted in a tank so that the oil discharges directly into the tank the discharge can be effected with no output connections.

The closed end 10B of the cylindrical body 10 has a threaded aperture 33 in which a threaded screw plug 34 is fitted. The position of the plug 34 can be adjusted to regulate the position of a support disc 36. Between this disc 36 and the valve piston 14, a chamber 28 is formed, in which a compression spring 38 is mounted, which biasses the piston 14, to press against the conical seat 16 to a normally closed position.

An elongate axial passageway 26 is formed in the valve piston; this allows the oil contained in the input passageway 12A to reach chamber 28 so that there is substantially the same fluid pressure on both faces 13, 15 of the piston 14. The small difference being due to the loss of pressure in the annular zone 17 which forms the valve.

The valve piston 14, which is constructed of ferromagnetic material, forms the core of an electromagnetic coil 32 which surrounds the body 10 of the valve and which, when energized applies to the valve piston a force substantially proportional to the intensity of current which is flowing in the coil. The coil itself is enclosed in a ferromagnetic cover formed by two parts 48 and 50, and is kept in position on the body 10 by a sleeve 37 which locks it against the support of a flange 52 of the body 10. The body 10 is not made of a ferromagnetic material. The sleeve 37 is in its turn held in place by a nut 35 screwed on the threaded external surface of the end 10B of the body 10.

The construction of the valve is such as to make the piston 14 work in the zone of maximum force exerted by the electromagnet 32. The control force of the electromagnet must thus, in practice, only overcome the small returning force of the spring 38 neglecting the small force due to the pressure not acting on the annular surface 17. A small electrical power is therefore sufficient to control the position of the valve piston 14, moving it away from the conical seat 16, and varying the flow of the oil.

By adjusting the position of the disc 36 with the screw 34 it is possible to regulate the force of the spring and thereby to vary the sensitivity of the valve to the electric control signal applied to the coil 32.

The valve does not require any special manufacturing for the fit between the piston 14 and the valve cylinder 11, because even if the fit is not fluid-tight this does not cause inconvenience. On the other hand a small amount of play is useful to allow a good lubrication and an easy sliding of the piston 14 within the bore 11.

The only two parts in which fluid-tight joints are required, are the connections of the cylinder head 12 and the screw 34 to the respective parts of the body 10. A fluid-tight engagement is in fact ensured here by two O-rings 40 and 42.

According to an embodiment of this invention which is not illustrated the possibility is envisaged of varying the section of the passageway 26 along the valve piston 14 in order to regulate the operation of the valve.

In FIG. 3 there is shown an application of the valve according to the invention in a fluid circuit. A valve E is placed in parallel connection to a pump P which supplies fluid under pressure along a tube C to a device U which is responsive to the pressure in the fluid. When the valve is open the oil circulates without increasing in pressure. By reducing the opening the pressure in the pipe C can be increased to the point of obtaining the whole pressure supplied by the pump p.

Although only a preferred embodiment of the invention has been described it is clear that there are possible modifications and variations to what has been illustrated without departing from the scope of this invention.

Thus, for example, the spring 28 could be mounted on the other side of the valve piston 14 naturally with due adaptation of the connection 12. In such case, the spring would act on the piston so as to keep it normally away from the seat 16 and the force on the piston by the magnetic circuit must be modified so as to move the valve piston to a closing position when the coil is energized.

Furthermore the conical seat 16 could be flat or spherical. Instead of only one longitudinal passageway 26, the valve piston could have many more for the aims above specified.

What is claimed is:

1. A solenoid operated fluid pressure modulating valve, a nonmagnetic valve body defining a cavity having inlet passage means and outlet passage means at one end thereof, said inlet passage means defining a valve seat within said cavity, solenoid means surrounding said body, a substantially cylindrical piston of a ferro magnetic material movably disposed in said cavity in axial alignment with said inlet passage means with one end face thereof adapted to engage said valve seat to variably restrict the flow of fluid from said inlet passage means to said outlet passage means under the action of a magnetic force exerted upon said piston by said solenoid means when energized, said cavity in said valve body being closed at its end remote from said inlet and outlet means to define a chamber adjacent the other end face of said piston, said piston having a longitudinal bore for permanent connection of the inlet passage means to said chamber whereby substantially equal pressures will be exerted by the fluid on both end faces of said piston, and adjustable spring means disposed in said chamber for biasing said piston for engagement with said valve seat.

* * * * *